Jan. 6, 1953   B. CHANCE ET AL   2,624,509
ELECTRICAL CIRCUIT FOR THE SOLUTION OF RIGHT TRIANGLES
Filed March 22, 1945

INVENTOR.
BRITTON CHANCE
ROBERT C. KELNER
BY William D. Hall
ATTORNEY

Patented Jan. 6, 1953

2,624,509

UNITED STATES PATENT OFFICE 2,624,509

ELECTRICAL CIRCUIT FOR THE SOLUTION OF RIGHT TRIANGLES

Britton Chance, Cambridge, and Robert C. Kelner, Boston, Mass., assignors, by mesne assignments, to the United States of America as represented by the Secretary of War Application March 22, 1945, Serial No. 584,232

3 Claims. (Cl. 235—61.5)

1

The present invention relates to improvements in electrical circuits for the solution of right triangles.

In many electrical systems, for example those used for gun directing or target location, some device is necessary whereby an unknown side of a right triangle may be computed electrically when the other two sides are known. A special case is that of a radio object-locating system for use in an aircraft, in which pulses of electromagnetic energy are sent out to determine one side of the right triangle, and the altitude of the plane which is the vertical side of the triangle, may be determined from the time of return of echo signals.

Under some circumstances, the horizontal range to an object from the aircraft is known from ordinary navigational procedure, and it is desirable to determine the slant range of the object for purposes of identifying it on some type of display means which indicates slant range. This is equivalent to finding the hypotenuse of a right triangle whose sides are of known length.

One type of device previously used for this purpose employed phase shifters comprising rotating coils or a static resistance-reactance combination. The former was rather complex and bulky, whereas the latter entailed difficulties due to a variation of both phase and magnitude of output with frequency.

An object of the present invention, therefore, is to provide a novel method of electrical solution of right triangles requiring no phase-shifting device.

Another object of the invention is to adapt the method of solution to make possible the determination of the hypotenuse of a right triangle, when the two other sides are known.

This invention provides generally a means for generating a voltage waveform having a time variation which is substantially hyperbolic, and a means for utilizing this waveform to produce a time interval, the magnitude of which is proportional to the length of the unknown side of a right triangle, the two other sides of which are known.

Figure 1:
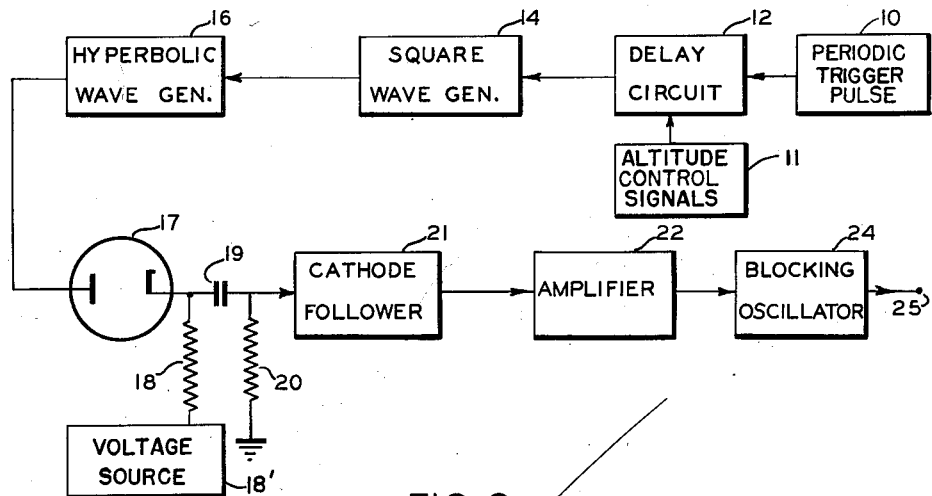

Other objects, features and advantages of this invention will suggest themselves to those skilled in the art, and will become apparent from the following description of the invention taken in connection with the accompanying drawing, in which:

Fig. 1 is a functional diagram of a form of the invention adapted to be used with a radio object-locating device;

2

Figure 2:
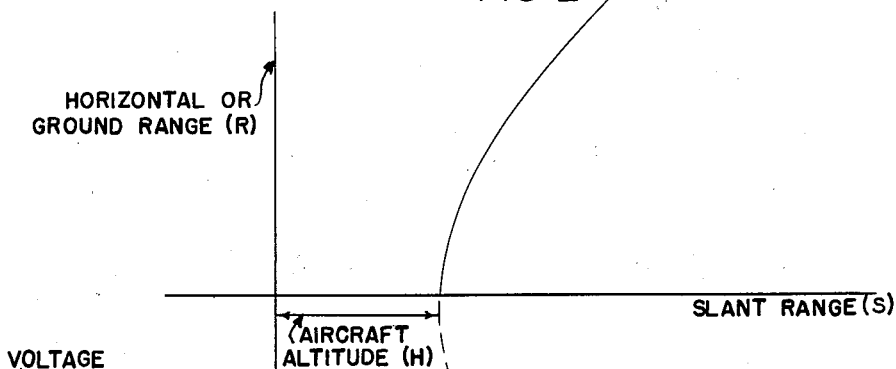
Figure 3:
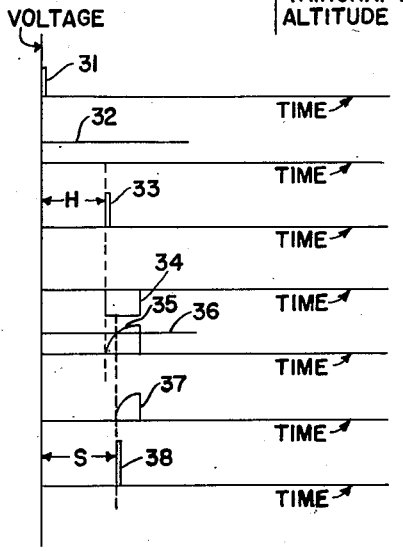

Fig. 2 is a curve, showing the variation of the horizontal range of an object with slant range, provided the altitude of the observing aircraft remains constant; and Fig. 3 is a series of wave forms showing the voltages and their times of occurrence at various points in the circuit of Fig. 1.

Referring now to Figs. 1 and 3, a source 10 of periodic trigger pulses 31, and a source 11 of altitude-control signals 32, are connected, as indicated, to delay circuit 12, which produces an output pulse 33 following the input trigger pulse at a time interval H determined by the altitude-control signal. Delay circuit 12 may include a multivibrator producing rectangular pulses, the width of which is determined by the altitude-control signal, a voltage proportional to the altitude of the plane. The trailing edges of said rectangular pulses may, in a peaking circuit as well known in the art, produce pulses delayed as set forth above. The altitude-control signal may be obtained from any conventional type of so-called terrain-clearance indicator, or altimeter adapted to produce a voltage proportional to altitude. Such signal may be obtained as a measure of the time between the transmission of a pulse from the radio object-detection equipment and the first echo, which will be from a point directly under the aircraft. The pulse 33 produced by delay circuit 12 is applied to a square-wave generator 14, which may be a multivibrator or one of the other circuits well known in the prior art, and having a similar output waveform.

The square wave 34 produced by generator 14 is used to drive a hyperbolic-wave generator 16, the output of which is a series of waves 35 having an essentially hyperbolic shape, the initial point of each wave being coincident with the delayed pulse 33 from delay circuit 12. This generator may be of the type described in the copending application of Jack H. Irving, Serial Number 570,412, filed December 29, 1944.

This hyperbolic wave 35 is applied to the plate of diode 17, while from a suitable source represented at 18', a positive voltage 36 proportional to the known horizontal range, is applied to the cathode of the same diode through resistor 18. The pulse 37 which occurs when diode 17 starts conducting is applied through capacitor 19 to cathode follower 21 and amplifier 22 in turn, and is then used to trigger blocking oscillator 24 and cause it to produce a pulse 38 appearing at output terminal 25.

Fig. 2 shows the variation of horizontal or ground range R with slant range S, if the altitude H of the observing aircraft is kept constant. By algebraic considerations, this curve may be shown to be hyperbolic in shape, and to intersect the horizontal axis at a point where $S=H$.

Referring now to the curves of Figs. 2 and 3 to explain the operation of a system including the apparatus of Fig. 1, it can be seen that since the echo time between a transmitted pulse and an echo pulse from a designated object is proportional to the slant range of that object, then the horizontal range of this object must vary hyperbolically with respect to this echo time. Thus, if there is provided a voltage waveform, the amplitude of which varies hyperbolically with time as measured from the instant of the transmitted pulse, then this amplitude will be proportional at any instant to the horizontal range of a target which would return an echo at that instant. It can further be seen that the amplitude of this voltage will be zero until such time as it would take for a pulse to travel to a distance H and return.

Assuming the apparatus of Fig. 1 to be used with a radio-object-locating system, a trigger pulse 31 is applied to the delay circuit 12 at the time of a transmitted pulse. The output of delay circuit 12, which output is a trigger pulse 33 delayed in proportion to altitude voltage 32, is sent as a synchronizing pulse to square-wave generator 14. This generator produces a negative square wave 34, the leading edge of which occurs at the time of the delayed trigger pulse 33. This negative square wave is used to cut off the switch tube of the hyperbolic-wave generator 16, and cause it to initiate a hyperbolic voltage wave 35.

A positive voltage 36 from source 18', proportional to the known ground range R, is applied through resistor 18 to the cathode of diode 17. When the amplitude of the hyperbolic voltage 35 applied to the plate of diode 17 becomes equal to the bias voltage 36 on the cathode, the diode starts conducting. The time delay between the transmitted pulse and the beginning of conduction can be seen from the foregoing discussion to be proportional to the slant range of the object.

The sudden change of voltage when the diode starts to conduct, is applied, through a peaker circuit consisting of condenser 19 and resistor 20, to cathode follower 21, and is then fed as pulse 37 to amplifier 22, the output of which triggers blocking oscillator 24 and causes it to emit a pulse 38, which is taken from terminal 25.

Comparison may be made between the time of the slant-range pulse from terminal 25 and the time of an actual echo pulse returned from the object. If any difference is noted, the assumed ground range may be corrected as necessary to cause coincidence. A continuous check is thus available on the navigational computations.

It will be obvious to those skilled in the art that the apparatus need not be used in conjunction with a radio object-locating system as described, but could be used independently for the solution of triangles, provided some means, such as referred to above, is used to produce a time delay proportional to one of the known sides of the triangle.

One of the broader aspects of our invention resides in the novel method of operation for solving electrically for the hypotenuse of a right triangle, in which method there is generated a voltage waveform having a time variation which is hyperbolic, this waveform being then utilized to produce a time interval whose magnitude is proportional to the length of the hypotenuse.

While there has been described what is at present considered to be the preferred embodiment of the invention, it will be obvious to those skilled in the art that various changes and modifications may be made therein without departing from the scope of the invention as set forth in the appended claims.

The invention claimed is:

1. In an electrical circuit for the solution of right triangles, a source of trigger pulses, a source of control pulses characterized by the fact that the output control pulses therefrom are proportional to the altitude of the triangle, a delay circuit connected to said first and second-named sources, a square-wave generator having its input side connected to the output side of said delay circuit, the output trigger pulses from said delay circuit being effective as synchronizing pulses with respect to said square-wave generator, a hyperbolic-wave generator connected to said square-wave generator and driven by the square-wave output from the latter to generate a series of hyperbolic waves in which the initial point of each wave is substantially coincident with a delayed pulse from said delay circuit, an electron tube having a plate and a cathode, the output side of said hyperbolic-wave generator being connected to said plate, a source of positive voltage proportional to the base of said triangle and connected to said cathode, a peaker circuit connected to said tube and consisting of a condenser and a resistor, a cathode follower connected to said peaker circuit, an amplifier connected to the output side of said peaker circuit, and a blocking oscillator connected to said amplifier and triggered by the output pulses therefrom.

2. An electrical circuit for solving for the hypotenuse of a right triangle, wherein the two other sides are known, comprising means for producing a voltage wave having a variation in amplitude substantially hyperbolic with respect to time, means for controlling the initial occurrence with respect to time of said wave in accordance with the value of one of said sides of said triangle, means for generating a pulse in response to a given amplitude of said wave, and means for controlling said given ampitude in accordance with a voltage having a value corresponding to that of the other of said sides, the time interval between said initial occurrence and of said pulse being a measure of said hypotenuse.

3. An electrical circuit for solving for the third side of a right triangle in which the other two sides are known, comprising means for producing a voltage wave having a variation in amplitude that is substantially hyperbolic with respect to time, means for controlling the initial occurrence with respect to time of said wave in accordance with one of the two known sides of said triangle, means for generating a signal in response to a given amplitude of said wave, and means for controlling said given amplitude in accordance with the other of said two known triangle sides, said signal indicating said third side.

BRITTON CHANCE.
ROBERT C. KELNER.

No references cited.